United States Patent
Poole

(10) Patent No.: US 10,614,474 B2
(45) Date of Patent: Apr. 7, 2020

(54) SYSTEMS AND METHODS FOR PRODUCT PLACEMENT OPTIMIZATION BY SENSING CUSTOMER TRAFFIC IN STORES

(71) Applicant: Capital One Financial Corporation, McLean, VA (US)

(72) Inventor: Thomas S. Poole, Chantilly, VA (US)

(73) Assignee: Capital One Services, LLC, McLean, VA (US)

( * ) Notice: Subject to any disclaimer, the term of this patent is extended or adjusted under 35 U.S.C. 154(b) by 564 days.

(21) Appl. No.: 14/811,151

(22) Filed: Jul. 28, 2015

(65) Prior Publication Data

US 2016/0027029 A1 Jan. 28, 2016

Related U.S. Application Data

(60) Provisional application No. 62/029,789, filed on Jul. 28, 2014.

(51) Int. Cl.
*G06Q 30/02* (2012.01)
*G06Q 10/08* (2012.01)

(52) U.S. Cl.
CPC ....... *G06Q 30/0205* (2013.01); *G06Q 10/087* (2013.01)

(58) Field of Classification Search
USPC ....................................... 705/7.34
See application file for complete search history.

(56) References Cited

U.S. PATENT DOCUMENTS

2003/0083925 A1* 5/2003 Weaver ................. G06Q 10/06
705/7.34
2006/0069749 A1* 3/2006 Herz ..................... G06Q 30/02
709/219

(Continued)

FOREIGN PATENT DOCUMENTS

WO WO 2014/088906 8/2014

OTHER PUBLICATIONS

Morillo et al. (Advertising Liking Recognition Technique Applied to Neuromarketing by Using Low-Cost EEG Headset, Part of the Lecture Notes in Computer Science book series (LNCS, vol. 9044), International Conference on Bioinformatics and Biomedical Engineering, IWBBIO 2015: Bioinformatics and Biomedical Engineer.*

(Continued)

*Primary Examiner* — Brian M Epstein
*Assistant Examiner* — Matthew D Henry
(74) *Attorney, Agent, or Firm* — Finnegan, Henderson, Farabow, Garrett & Dunner, LLP

(57) ABSTRACT

The disclosed embodiments generally relate to in-store customer traffic analysis systems and methods. The system includes at least one sensor positioned within a retail store, at least one display associated with the at least one sensor, one or more memory devices storing instructions and one or more hardware processors configured to execute the instructions to perform operations. The operations include receiving a sensor signal indicating that a user device is within a proximity to the at least one sensor in the retail store, extracting a user device identifier from the sensor signal, correlating the sensor signal to the at least one display, generating a foot traffic record associated with the user device identifier and the at least one display, based on the received sensor signal, and storing the generated foot traffic record.

20 Claims, 11 Drawing Sheets

220

Store ID: 12345 | Date | Display K

| Time | Demographic(s) | Score |
|---|---|---|
| 0800-0900 | F \| 50-65 | 34 |
| 0900-1000 | M \| 30-45 \| children | 54 |
| 1000-1100 | Engineers I >$100k | 12 |
| | Age 14-24 | 76 |
| 1100-1200 | Monthly CC spend > $1000 | 15 |
| | M \| married | 45 |
| | F \| married | 86 |

230

| Demographic | Display # | Day/Times | Score |
|---|---|---|---|
| M/F \| 14-24 USA \| Store ID 12345 | 1 | Sun 1500-1600 | 10 |
| | 3 | Sun 1500-1600 | 10 |
| | | Sat 1500-1600 | 53 |
| | 7 | Wed 0930-1000 | 23 |
| M \| 25-40 \| children USA \| Store ID 89084 | 4 | Sat 0900-0930 | 67 |
| | 9 | Sun 1000-1030 | 37 |
| | 27 | Mon 1415-1445 | 44 |
| F \| married \| >2 cards EUR \| Store ID A3FR5 | 1 | Mon 1730-1900 | 5 |
| | 1 | Tue 1730-1900 | 16 |
| | 2 | Wed 1730-1900 | 27 |
| | 5 | Thu 1730-1900 | 23 |
| | 6 | Fri 1730-1900 | 14 |

(56) References Cited

U.S. PATENT DOCUMENTS

| | | | | |
|---|---|---|---|---|
| 2006/0074769 A1* | 4/2006 | Looney | ............... | G06Q 30/02 |
| | | | | 705/14.66 |
| 2012/0280825 A1* | 11/2012 | Sakakihara | ............ | G01C 21/08 |
| | | | | 340/686.1 |
| 2013/0030915 A1 | 1/2013 | Statler et al. | | |
| 2013/0322704 A1* | 12/2013 | Harrison | ............ | G06K 9/00885 |
| | | | | 382/115 |
| 2014/0337151 A1* | 11/2014 | Crutchfield | ........... | G06F 1/1601 |
| | | | | 705/17 |

OTHER PUBLICATIONS

International Search Report dated Oct. 23, 2015; PCT Application No. PCT/US15/42442 (11 pages).

* cited by examiner

Retail Displays 161

Wall hangings, decorations, billboards, etc. 162

Electronic Displays 163

Signs (e.g., directions) 164

Lighting 165

220

Store ID: 12345 | Date | Display K

| Time | Demographic(s) | Score |
|---|---|---|
| 0800-0900 | F | 50-65 | 34 |
| 0900-1000 | M | 30-45 | children | 54 |
| 1000-1100 | Engineers | >$100k | 12 |
| | Age 14-24 | 76 |
| 1100-1200 | Monthly CC spend > $1000 | 15 |
| | M | married | 45 |
| | F | married | 86 |

230

| Demographic | Display # | Day/Times | Score |
|---|---|---|---|
| M/F | 14-24 USA | Store ID 12345 | 1 | Sun 1500-1600 | 10 |
| | 3 | Sun 1500-1600 | 10 |
| | | Sat 1500-1600 | 53 |
| | 7 | Wed 0930-1000 | 23 |
| M | 25-40 | children USA | Store ID 89084 | 4 | Sat 0900-0930 | 67 |
| | 9 | Sun 1000-1030 | 37 |
| | 27 | Mon 1415-1445 | 44 |
| F | married | >2 cards EUR | Store ID A3FR5 | 1 | Mon 1730-1900 | 5 |
| | 1 | Tue 1730-1900 | 16 |
| | 2 | Wed 1730-1900 | 27 |
| | 5 | Thu 1730-1900 | 23 |
| | 6 | Fri 1730-1900 | 14 |

FIG. 2B

SYSTEMS AND METHODS FOR PRODUCT PLACEMENT OPTIMIZATION BY SENSING CUSTOMER TRAFFIC IN STORES

PRIORITY CLAIM

This disclosure claims priority under 35 U.S.C. § 119 to U.S. provisional patent application No. 62/029,789 filed on Jul. 28, 2014, and entitled "Systems and Methods for Product Placement Optimization By Sensing Customer Traffic in Stores." The aforementioned application is incorporated herein by reference in its entirety.

TECHNICAL FIELD

The disclosed embodiments generally relate to systems and methods for retail merchandising, and more particularly, to systems and methods for product placement optimization by sensing in-store customer traffic.

BACKGROUND

Merchants generally determine which products to offer for sale in their stores, how to present those products to customers, and what a reasonable retail price is for those products. With these decisions, merchants seek to drive higher sales of profit-making retail products and/or to efficiently reduce distressed inventory. Product placement refers to decisions associated with the display of goods within the store, typically to promote sales and/or maximize profit for the merchant (via, e.g., reduced inventory costs). Merchants often utilize displays, showcases, backdrops, lighting effects, etc. in product placement to attract the attention of shoppers to their products. Merchants may also desire to identify the key demographics of consumers who are likely to purchase a product so that they may quickly attract such customers to their product displays, thereby increasing profitability through a quick sale.

Currently, merchants lack customized information regarding the in-store behaviors of their customers or the ability to utilize such information in making decisions (such as, for example, which products to offer for sale, how to present those products to customers, at what retail price to list those products, etc.). Nor do merchants have access to empirical data on the key consumer demographics for consumers visiting their stores, and how those demographics relate to the products that merchants have on display in their stores. Thus, a need exists for systems and methods for product placement optimization.

SUMMARY

In the following description, certain aspects and embodiments of the present disclosure will become evident. It should be understood that the disclosure, in its broadest sense, could be practiced without having one or more features of these aspects and embodiments. Specifically, it should also be understood that these aspects and embodiments are merely exemplary. Moreover, although disclosed embodiments are discussed in the context of merchant systems and environments for ease of discussion, it is to be understood that the disclosed embodiments are not limited to any particular industry. Instead, disclosed embodiments may be practiced by any entity in any industry that would benefit from an improved understanding of customer foot traffic.

Certain disclosed embodiments provide systems and methods for product placement optimization by sensing customer traffic in stores. For example, certain disclosed embodiments may use Bluetooth® low energy ("BLE") beacons in a retail store to track customer foot traffic through a store for use in optimizing merchandise placement. As an illustration, some embodiments may enable a merchant to identify a demographic of a customer in the store, and change, modify, and/or re-orient a display of merchandise intended to appeal to that demographic so that the customer is provided with a better presentation of that merchandise. In certain disclosed embodiments, the BLE beacons may eliminate the need for running a merchant app on the customer's device to track customers in the store.

In certain disclosed embodiments, customer data regarding a plurality of customers can be aggregated, reviewed centrally, and then used as a basis to feed more dynamic marketing displays from a remote control center. As an example, a centralized server system for a retail outlet chain may provide analytics on aggregated customer in-store data to modify product placement strategies in one of the outlets within the chain. Certain disclosed embodiments may also facilitate testing of different offers to see which offers drive higher sales conversion and/or best reduce distressed inventory.

Other aspects of the disclosed embodiments are set forth below in this disclosure. For example, the disclosed embodiments may include a system for analyzing in-store customer traffic. The system may include, for example, at least one sensor positioned within a retail store, at least one display associated with the at least one sensor, one or more memory devices storing instructions, and one or more processors configured to execute the instructions to perform operations. Upon executing the instructions, for example, the processors may receive a sensor signal indicating that a user device is within a proximity to the at least one sensor in the retail store. The processors may further extract a user device identifier from the sensor signal, correlate the sensor signal to the at least one display, and generate a foot traffic record associated with the user device identifier and the at least one display based on the received sensor signal. The processors may also store the generated foot traffic record.

The disclosed embodiments also include a computer-implemented method for analyzing in-store customer traffic. The method may include, for example, receiving a sensor signal indicating that a user device is within a proximity to a sensor in a retail store, the sensor being associated with at least one display in the retail store. The method may include extracting a user device identifier from the sensor signal, correlating the sensor signal to the at least one display, and generating a foot traffic record associated with the user device identifier and the at least one display based on the received sensor signal. The method may also include storing the generated foot traffic record.

In accordance with additional embodiments of the present disclosure, a computer-readable medium is disclosed that stores instructions that, when executed by a processor(s), causes the processor(s) to perform operations consistent with one or more disclosed methods.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 2B is an exemplary data structure of aggregate consumer data that may be compiled based on sensing customer traffic in stores, consistent with disclosed embodiments;

DETAILED DESCRIPTION

Reference will now be made in detail to exemplary embodiments, examples of which are illustrated in the accompanying drawings and disclosed herein. Wherever convenient, the same reference numbers will be used throughout the drawings to refer to the same or like parts.

Figure 1A:
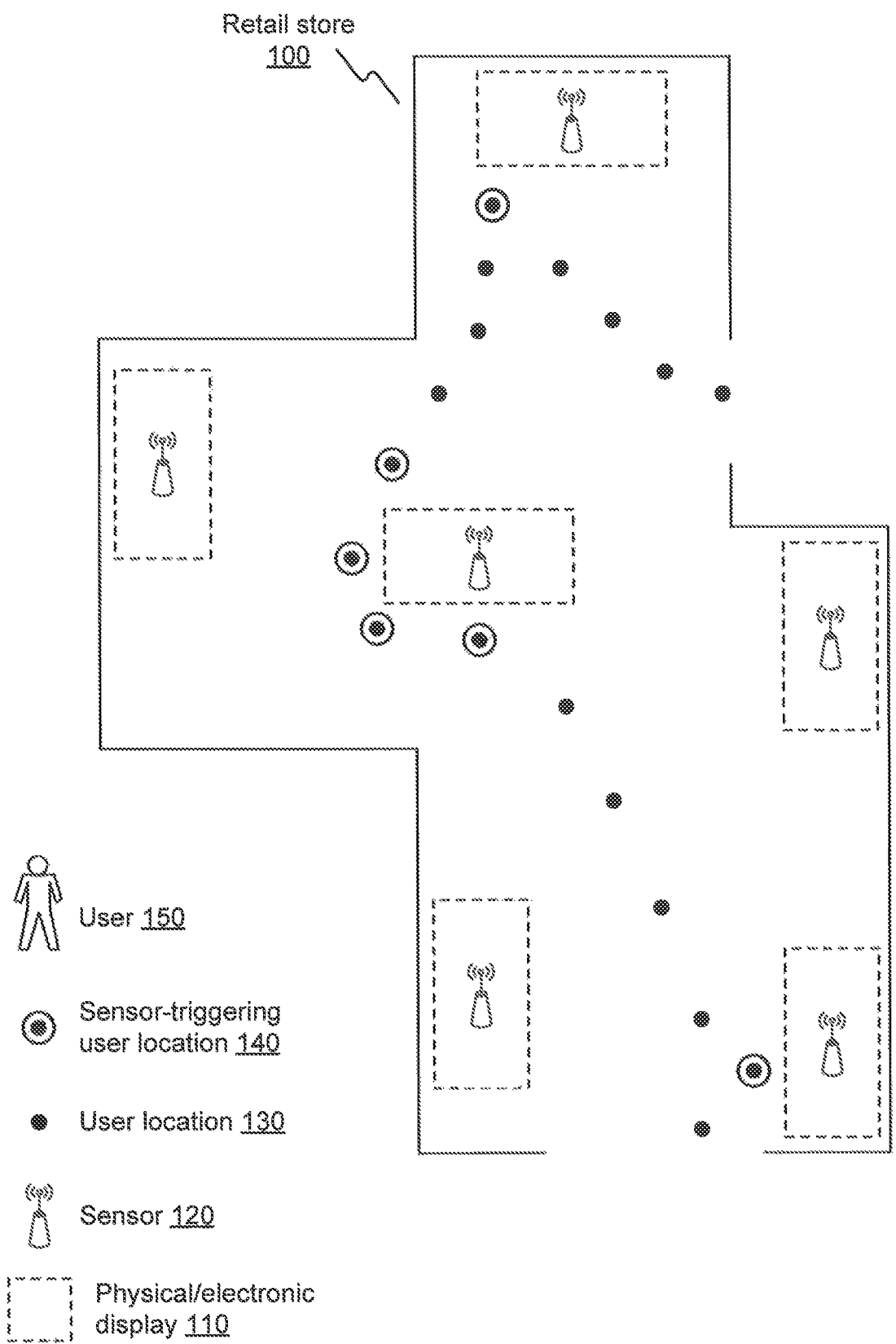
FIG. 1A is a block diagram of an exemplary environment for sensing customer traffic in stores, consistent with disclosed embodiments.

FIG. 1A is a block diagram of an exemplary environment for sensing customer traffic in stores, consistent with disclosed embodiments. In some embodiments, a user 150 may enter (for example, as a potential customer) into a retail store 100 implementing a network of sensors 120. User 150 may move about the store 100. In some embodiments, user 150 may be carrying and/or operating a user device (not shown), such as a smart phone. As user 150 moves within store 100, user 150's path may include positions within retail store 100 referred to in FIG. 1A as locations 130. When user 150's path nears close enough that a sensor 120 is triggered, sensor 120 may detect the presence of user 150 (and/or user 150's user device). In some embodiments, one or more sensors may also be associated with a display 110 (e.g., physical/electronic display). Thus, triggering of a sensor may be indicative of a user 150 within a known proximity to the display. When a sensor 120 is triggered by a user location 140, the identification of the sensor 120 may also indicate a direction from which the user 150 approached the display 110. In this manner, user interest in a display 110 may be discerned from the identification of the sensors 120 that are triggered by the user 150 moving within the retail store 100. In certain embodiments, the movements of a user 150 may be tracked using a similar methodology as described above, from the moment the user 150 enters the retail store 100, until the user 150 exits the retail store 100. In certain embodiments, such tracking may be conducted in real-time for substantially all (e.g., ~90%) users entering and/or exiting the retail store 100.

In certain embodiments, the sensors 120 may use Bluetooth® low energy ("BLE") beacons in the retail store 100 to track customer foot traffic. The BLE beacons may sense the presence of a user device being carried by the user 150. In certain embodiments, the user device may be executing a software application to facilitate detection of the user device by the sensors 120. In some embodiments, the software application may be an application provided by a merchant associated with the retail store 100 to the user 150. In certain disclosed embodiments, however, the use of BLE beacons or other technologies may eliminate the need for running a merchant application, or indeed any software application, on the customer's device to facilitate tracking customers in the store. In such scenarios, a pure-hardware solution may be implemented on the device to facilitate signal communication between the user device and sensor 120, so that sensor 120 may detect the presence of the user device and/or exchange information with the user device. Other candidate sensing technologies may include, without limitation, cellular (e.g., 3G, 4G, etc.) technology, Wi-Fi™ hotspot technology, near-field communication ("NFC"), other Bluetooth® technologies, and/or the like. This disclosure contemplates that any uni- or bi-directional communication technology known to one of ordinary skill in the art may be utilized by the sensors 120 to detect the presence of the user device and/or exchange information with the user device. The user device, in turn, may be any device known to one of ordinary skill for uni- or bi-directional communication, such as a smartphone, cellular phone, tablet computer, radio-frequency identification ("RFID") chip, smart card, and/or the like.

Figure 1B:
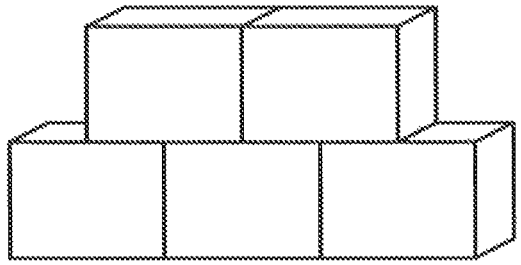
FIG. 1B is a block diagram of exemplary merchant store equipment that can be modified based on sensing customer traffic in stores, consistent with disclosed embodiments.
Figure 1B:
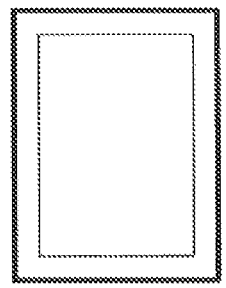
Figure 1B:
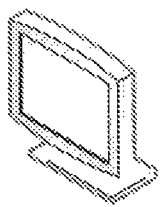
Figure 1B:
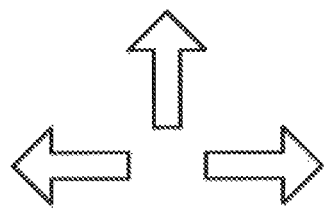
Figure 1B:
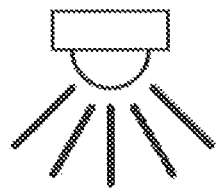

FIG. 1B is a block diagram of exemplary merchant store equipment that can be modified based on sensing customer traffic in stores, consistent with disclosed embodiments. Using the information obtained from sensors 120 about the displays 110 that users 150 approach, the direction from which the users 150 approach them, and information concerning the users 150 themselves, disclosed embodiments may be utilized to control various types of the equipment available within retail store 100. As an illustration, sensor information may enable a merchant to identify a demographic of a customer in the store at certain times (time periods during the day, certain days of the week, surrounding certain holidays, etc.), and change, modify, and/or re-orient a display of merchandise intended to appeal to that demographic so that the customer is provided with a more targeted presentation of that merchandise. For example, responsive to the individual or aggregate sensor information collected about the in-store customer traffic, physical displays 161 in the retail store can be modified (e.g., robotically, or manually) to include an advertisement associated with a particular product or product group associated with, a marketing campaign targeting a user demographic. Similarly, wall hangings, decorations, billboards, and other ornamental equipment 162 may be modified automatically (if a control mechanism is available for modifying such equipment automatically) or manually responsive to the individual or aggregate sensor information collected about the in-store customer traffic. Electronic displays 163, signage 164 (e.g., for directions), lighting 165, or sound settings may be modified responsive to the individual or aggregate sensor information collected about the in-store customer traffic. This disclosure contemplates that any stimulus that customers may be able to perceive can be modified responsive to the individual or aggregate sensor information collected about the in-store customer traffic.

Figure 2A:
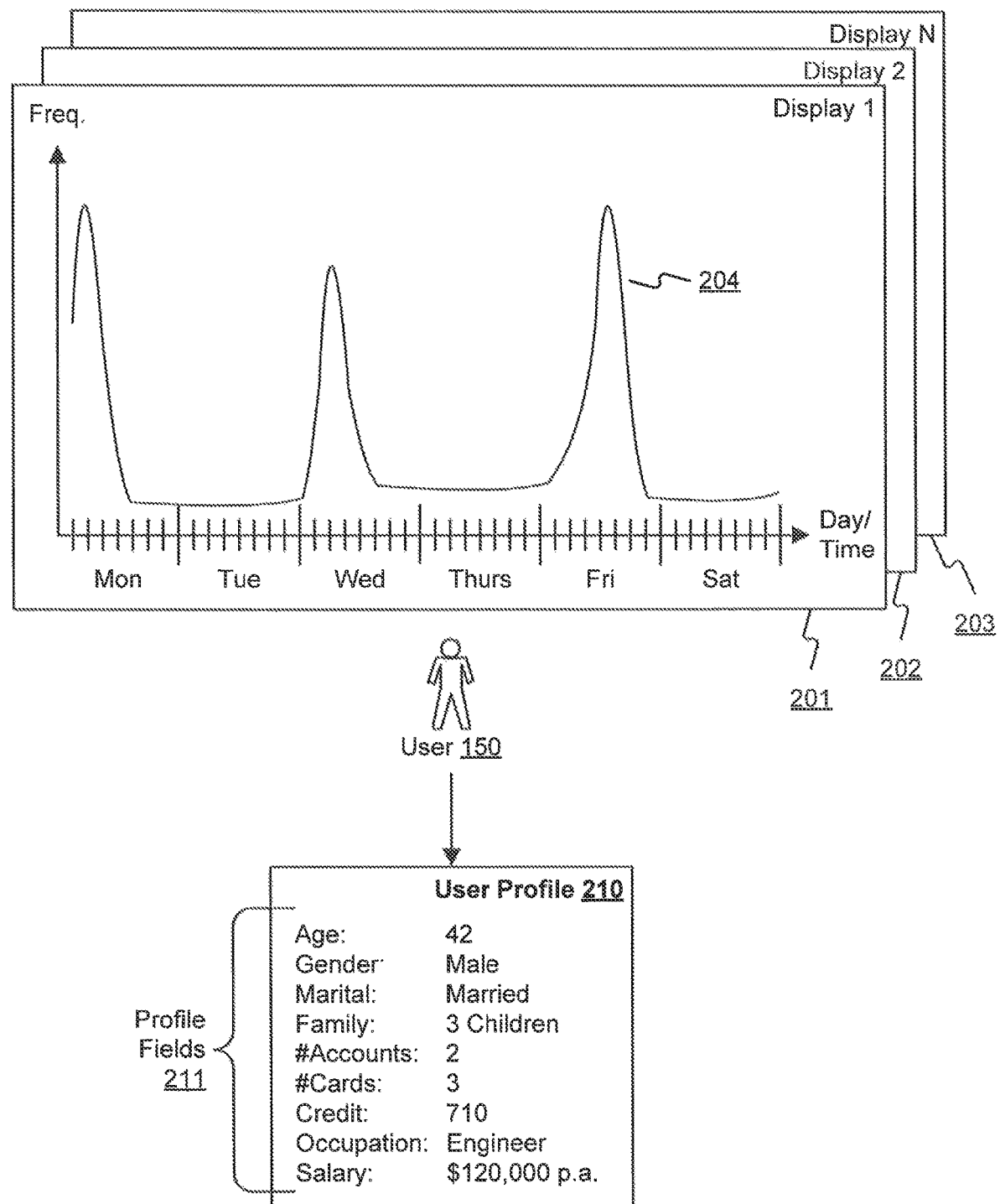
FIG. 2A is a diagram of exemplary data that may be collected about a customer in the store, consistent with disclosed embodiments.

FIG. 2A is a diagram of exemplary data that may be collected about a customer in the store, consistent with disclosed embodiments. In some embodiments, a back-end server may aggregate data obtained from sensors 120 about a user 150 moving about the retail store 100. The back-end server may categorize the sensor information based on the display(s) 1-N within the retail store 100 with which each sensor is associated. Accordingly, as purely an illustrative example, in some embodiments, the back-end server may be able to construct foot traffic graphs 201-203 representing the user's interaction with display(s) 1-N as a function of time. Also, the back-end server may retrieve a user profile 210 for the user 150, and associate the user profile information with the user's foot traffic graphs 201-203. The back-end server may obtain information to populate the user profile fields 211 from an application executing on the user's device, from Internet searches using keyword information obtained from the user, by requesting the user 150 to log into a social network so that the back-end server may query the social network for user profile information, and other such methods. The user profile fields 211 may include information such as, without limitation, age, gender, marital status, family size, financial account information, credit card or banking information, occupation, salary, and/or the like. In this manner, demographics of the user 150 may be associated with the foot traffic graphs 201-203 of the user 150 in the retail store 100. In certain embodiments, such foot traffic graphing and association with user demographics may be conducted in real-time for substantially all (e.g., ~90%) users entering and/or exiting the retain store 100.

FIG. 2B is an exemplary data structure of aggregate consumer data that may be compiled based on sensing customer traffic in stores, consistent with disclosed embodiments. In some embodiments, a back-end server may aggregate foot traffic graphs, such as FIG. 2A (201-203), for a large number of users in the retail store 100. Using such aggregated data, the back-end server may compile statistical data regarding the user demographics that visit particular displays within the store 100, the times during which members of such user demographics frequent the particular display within the store 100, and the like. The back-end server may also calculate a relative interest level (or score) between user demographics in a particular display, based in part on the frequency with which members of each user demographic visit a display within the store 100, and an amount of time that members of each user demographic spends in proximity of the display within the store 100. The back-end server may present such statistical data in a number of ways as a type of display-demographic map. As an illustration, the back-end server may present the data in a table 220 dividing the statistical data according to time slots within the day, and may present the user demographics that visited a particular display, and a score associated with that user demographic for that display, for that particular day and time slot. As another illustration, the back-end server may present the data in a table 230 dividing the statistical data according to user demographics, and may present the display identifiers and time slots within the day that each user demographic most visited the particular display, and a score associated with that user demographic for that display, for that particular day and time slot.

In general, it is to be understood that any manner of statistical analysis of individual or aggregate customer foot traffic information, either separately from or tied to user profile or user demographic information, is contemplated by this disclosure.

Figure 3A:
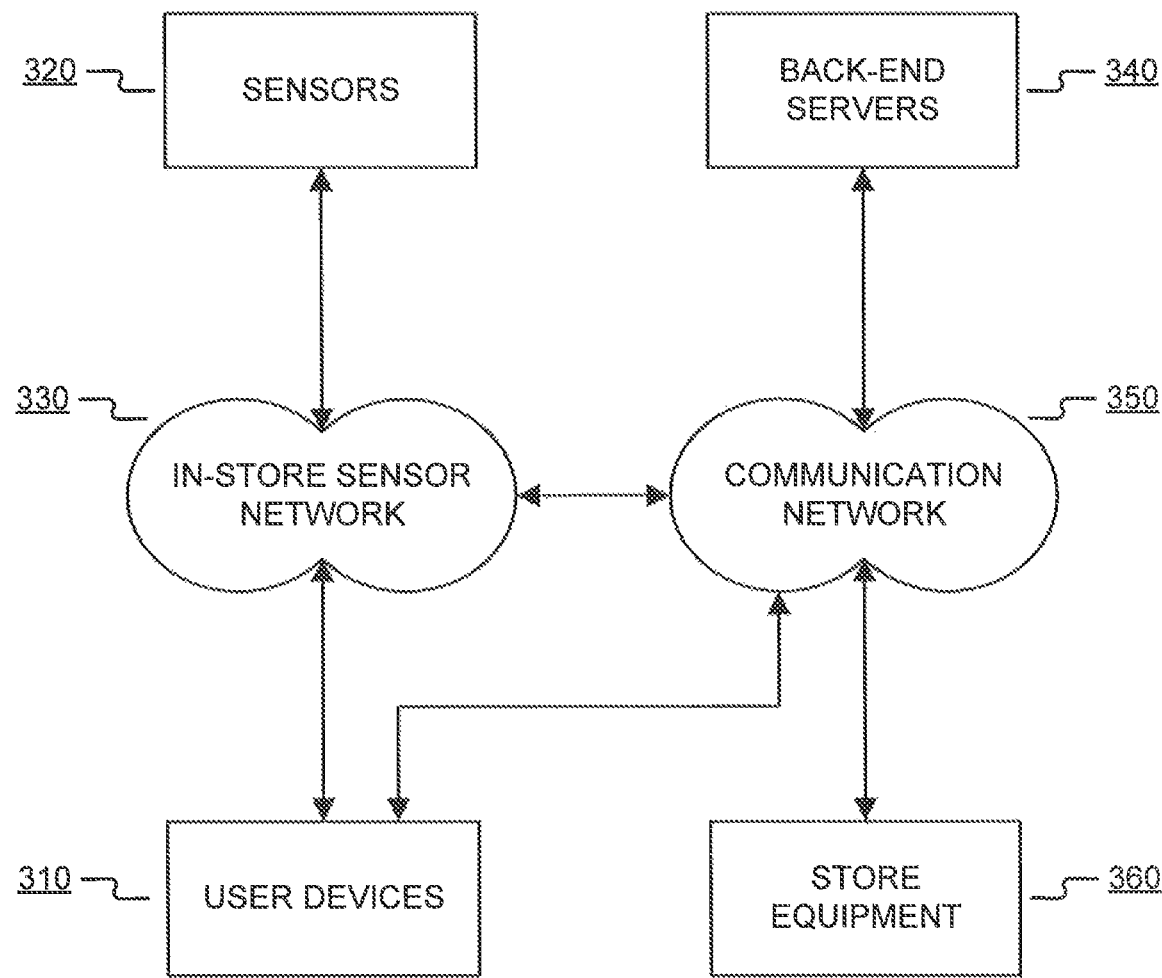
FIG. 3A is a block diagram of an exemplary system, consistent with disclosed embodiments.

FIG. 3A is a block diagram of an exemplary system, consistent with disclosed embodiments. As shown in FIG. 3A, system 300 may include user devices 310, sensors 320, store equipment 360, back-end servers 340, an in-store sensor network 330 to facilitate communication at least between user device 310 and sensors 320, and a communication network 350 to facilitate communication among the components of system 300. The components and arrangement of the components included in system 300 may vary. Thus, system 300 may further include other components that perform or assist in the performance of one or more processes consistent with the disclosed embodiments. The components and arrangements shown in FIG. 3A are not intended to limit the disclosed embodiments, as the components used to implement the disclosed processes and features may vary.

System 300 may include one or more user devices 310. A user may operate a user device 310, which may be a desktop computer, laptop, tablet, smartphone, multifunctional watch, pair of multifunctional glasses, tracking device, RFID chip, smart card, or any suitable device. The user device 310, in turn, may be any uni- or bi-directional communication device for communication with sensors 320. User device 310 may include one or more processor(s) and memory device(s) known to those skilled in the art. For example, user device 310 may include memory device(s) that store data and software instructions that, when executed by one or more processor(s), perform operations consistent with the disclosed embodiments. In one aspect, user device 310 may have an application installed thereon, which may enable user device 310 to communicate with sensors 320 via in-store sensor network 330. For instance, user device 310 may be a smartphone or tablet (or the like) that executes an application that logs the user device 310 into the in-store sensor network 330 when a user 150 enters the store 100. In some embodiments, user device 310 may connect to sensors 320 or back-end servers 340 through an application programming interface to communicate information to the sensors 320 or back-end servers 340, or through use of browser software stored and executed by user device 310. User device 310 may be configured to execute software instructions that allow a user to access information stored in back-end server 340, such as, for example, device information, user profile information, user demographic categories, and the like. Additionally, user device 310 may be configured to execute software instructions that initiate and interact with store equipment 360, such as, for example, to facilitate purchase transactions or barcode scans of retail sales products. A user may operate user device 310 to perform one or more operations consistent with the disclosed embodiments. In one aspect, a user may be a customer of the store corresponding to back-end server 340, store equipment 360, and/or sensors 320. An exemplary computer system consistent with user device 310 is discussed in additional detail with respect to FIG. 3B.

System 300 may include one or more sensors 320. Sensors 320 may be configured to detect the presence of users 150 and/or user devices 310 in a store. For example, sensors 320 may detect the presence of users directly via technologies such as facial recognition, fingerprint recognition, voice recognition, or other biometric techniques. In some embodiments, sensors 320 may detect user devices 310 in the store via communication technologies such as cellular (e.g., 3G, 4G, etc.) technology, Wi-Fi™ hotspot technology, near-field communication ("NFC"), Bluetooth® technology, and/or the like. In certain embodiments, the sensors 320 may use Bluetooth® low energy ("BLE") beacons to detect the presence of, and communicate with, user device 310. The BLE beacons may sense the presence of a user device 310 being carried by users 150. In certain disclosed embodiments, the use of BLE beacons or other technologies may eliminate the need for running any software application on the user devices 310 to facilitate detection of, and communication with, the user devices 310. In such scenarios, a pure-hardware solution may be implemented on the user devices 310 to facilitate signal communication between the user devices 310 and sensors 320, so that sensors 320 may detect the presence of the user devices 310 and/or exchange information with the user devices 310. This disclosure contemplates that any uni- or bi-directional communication technology known to one of ordinary skill in the art may be utilized by the sensors 320 to detect the presence of the user devices 310 and/or exchange information with the user devices 310.

In accordance with disclosed embodiments, system 300 may include back-end servers 340. Back-end servers 340 may be a system associated with a retailer (not shown), or an information technology service provider (not shown), or a financial institution (not shown) such as a bank, a credit card company, a credit bureau, a lender, brokerage firm, or any other type of financial service entity. Back-end servers 340 may be one or more computing systems that are configured to execute software instructions stored on one or more memory devices to perform one or more operations consistent with the disclosed embodiments. For example, back-end servers 340 may include one or more memory device(s) storing data and software instructions and one or more hardware processor(s) configured to use the data and execute the software instructions to perform server-based functions and operations known to those skilled in the art. Back-end servers 340 may include one or more general-purpose computers, mainframe computers, or any combination of these types of components.

In certain embodiments, back-end servers 340 may be configured as a particular apparatus, system, and the like based on the storage, execution, and/or implementation of the software instructions that perform one or more operations consistent with the disclosed embodiments. Back-end servers 340 may be standalone, or it may be part of a subsystem, which may be part of a larger system. For example, Back-end servers 340 may represent distributed servers that are remotely located and communicate over a network (e.g., communication network 350) or a dedicated network, such as a LAN, for a financial service provider. An exemplary computing system consistent with back-end servers 340 is discussed in additional detail with respect to FIG. 3B, below.

Back-end servers 340 may include or may access one or more storage devices (e.g., memory 373 and/or database 377) configured to store data and/or software instructions used by one or more processors of back-end servers 340 to perform operations consistent with disclosed embodiments. For example, back-end servers 340 may include memory 373 configured to store one or more software programs that performs various functions when executed by a processor. The disclosed embodiments are not limited to separate programs or computers configured to perform dedicated tasks. For example, back-end servers 340 may include memory that stores a single program or multiple programs. Additionally, back-end servers 340 may execute one or more programs located remotely from back-end servers 340. For example, back-end servers 340 may access one or more remote programs stored in memory included with a remote component that, when executed, perform operations consistent with the disclosed embodiments. In certain aspects, back-end servers 340 may include server software that generates, maintains, and provides user applications, customer foot traffic data, user profile information, user demographics information, retail/electronic display lists, display-demographic maps, inventory-demographic maps, retail inventory lists, and/or the like. In other aspects, back-end servers 340 may connect separate server(s) or similar computing devices that generate, maintain, and provide such services.

In accordance with disclosed embodiments, system 300 may include store equipment 360. Store equipment 360 may include various types of the equipment available within retail store 100. For example, store equipment 360 may include physical displays in the retail store that can be modified, e.g., robotically, or manually. Similarly, store equipment may include wall hangings, decorations, billboards, and other ornamental equipment that may be modified automatically (where a control mechanism, such as a robotic arm, is available for modifying such equipment) or manually. Store equipment may include electronic displays, electrical signage, lighting system, sound systems, tactile systems, and/or the like. In addition, store equipment 360 may include equipment for processing financial transactions, such as a card swipe terminal, store checkout terminal, accounting systems, and/or the like.

Communication network 350 and in-store sensor network 330 may comprise any type of computer networking arrangement used to exchange data. For example, communication network 350 and in-store sensor network 330 may be the Internet, a private data network, a virtual private network using a public network, a Wi-Fi™ network, a LAN or WAN network, and/or other suitable connections that may enable information exchange among various components of the system 300. Communication network 350 and in-store sensor network 330 may also include a public switched telephone network ("PSTN") and/or a wireless cellular network. Communication network 350 and in-store sensor network 330 may be a secured network or unsecured network. In other embodiments, one or more components of system 300 may communicate directly through a dedicated communication link(s), such as links between user devices 310, sensors 320, store equipment 360, and back-end servers 340.

Other components known to one of ordinary skill in the art may be included in system 300 to process, transmit, provide, and receive information consistent with the disclosed embodiments. In addition, although not shown in FIG. 3A, components of system 300 may communicate with each other through direct communications. Direct communications may use any suitable technologies, including, for example, wired technologies (e.g., Ethernet, PSTN, etc.), wireless technologies (e.g., Bluetooth™, Bluetooth LE™, Wi-Fi™, near field communications (NFC), etc.), or any other suitable communication methods that provide a medium for transmitting data between separate devices.

Figure 3B:
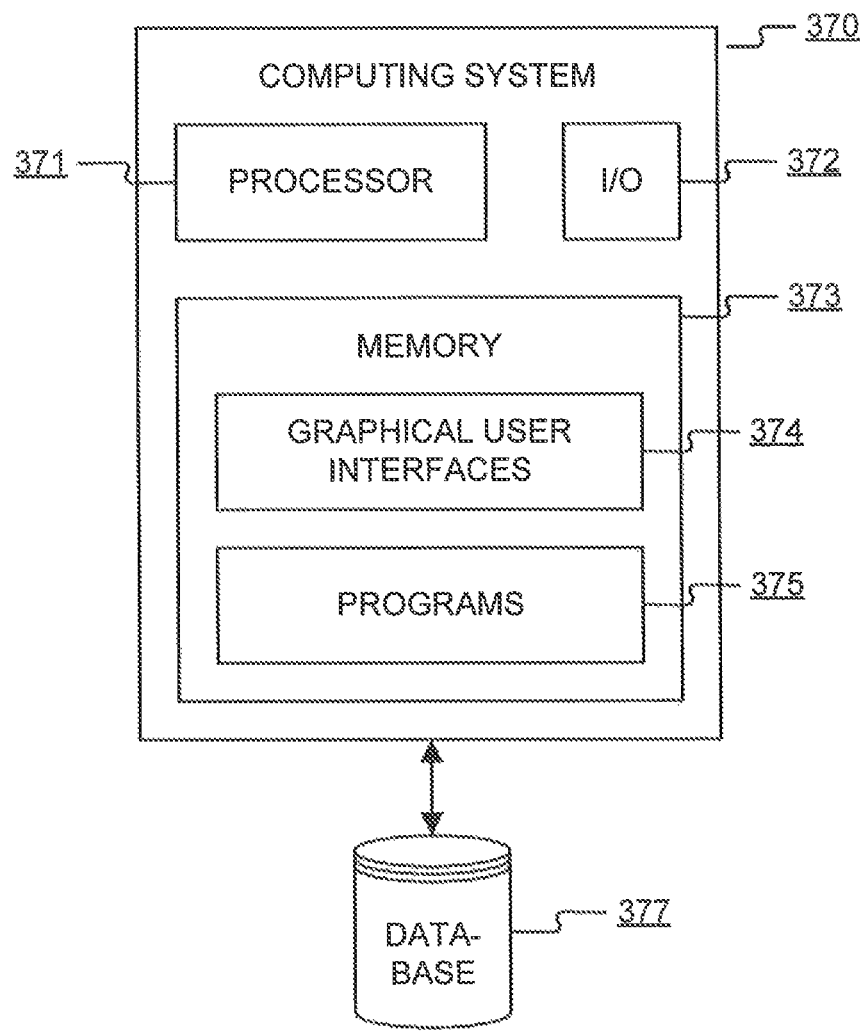
FIG. 3B is an exemplary computer system, consistent with disclosed embodiments.

FIG. 3B shows a diagram of an exemplary computing system 370 illustrating a computing system configuration that may be associated with user devices 310, sensors 320, store equipment 360, and/or back-end servers 340, consistent with disclosed embodiments. In one embodiment, computing system 370 may have one or more processors 371, one or more memories 373, and one or more input/output (I/O) devices 372. In some embodiments, computing system 370 may take the form of a server, general-purpose computer, a mainframe computer, laptop, smartphone, mobile device, or any combination of these components. In certain embodiments, computing system 370 (or a system including computing system 370) may be configured as a particular apparatus, system, and the like based on the storage, execution, and/or implementation of the software instructions that perform one or more operations consistent with the disclosed embodiments. Computing system 370 may be stand-alone, or it may be part of a subsystem, which may be part of a larger system.

Processor 371 may include one or more known processing devices, such as a microprocessor from the Pentium™ or Xeon™ family manufactured by Intel™, the Turion™ family manufactured by AMD™, or any of various processors manufactured by Sun Microsystems. Processor 371 may constitute a single core or multiple core processor that executes parallel processes simultaneously. For example, processor 371 may be a single core processor configured with virtual processing technologies. In certain embodiments, processor 371 may use logical processors to simultaneously execute and control multiple processes. Processor 371 may implement virtual machine technologies, or other known technologies to provide the ability to execute, control, run, manipulate, store, etc. multiple software processes, applications, programs, etc. In another embodiment, processor 371 may include a multiple-core processor arrangement (e.g., dual, quad core, etc.) configured to provide parallel processing functionalities to allow computing system 370 to execute multiple processes simultaneously. One of ordinary skill in the art would understand that other types of processor arrangements could be implemented that provide for the capabilities disclosed herein. The disclosed embodiments are not limited to any type of processor(s) configured in computing system 370.

Memory 373 may include one or more storage devices configured to store instructions used by processor 371 to perform functions related to the disclosed embodiments. For example, memory 373 may be configured with one or more software instructions, such as program(s) 375 that may perform one or more operations when executed by processor 371. The disclosed embodiments are not limited to separate programs or computers configured to perform dedicated tasks. For example, memory 373 may include a program 375 that performs the functions of computing system 370, or program 375 could comprise multiple programs. Additionally, processor 371 may execute one or more programs located remotely from computing system 370. For example, user devices 310, sensors 320, store equipment 360, and back-end servers 340, may, via computing system 370 (or variants thereof), access one or more remote programs that, when executed, perform functions related to certain disclosed embodiments. Processor 371 may further execute one or more programs located in database 377. In some embodiments, programs 375 may be stored in an external storage device, such as a cloud server located outside of computing system 370, and processor 371 may execute programs 375 remotely.

Programs executed by processor 371 may cause processor 371 to execute one or more processes related to aggregating in-store customer foot traffic information. Programs executed by processor 371 may further cause processor 371 to execute one or more processes related to statistical demographic analysis of customer foot traffic information. Programs executed by processor 371 may further cause processor 371 to execute one or more processes related to product placement optimization using in-store customer foot traffic information. Programs executed by processor 371 may also cause processor 371 to execute one or more processes related to financial services provided to users including, but not limited to, processing credit and debit card transactions, checking transactions, fund deposits and withdrawals, transferring money between financial accounts, lending loans, processing payments for credit card and loan accounts, processing ATM cash withdrawals, or the like.

Memory 373 may also store data that may reflect any type of information in any format that the system may use to perform operations consistent with the disclosed embodiments. Memory 373 may store instructions to enable processor 371 to execute one or more applications, such as server applications, a customer foot traffic data aggregation application, a customer demographic-foot traffic statistical analysis application, network communication processes, and any other type of application or software. Alternatively, the instructions, application programs, etc., may be stored in an external storage (not shown) in communication with computing system 370 via communication network 350, in-store sensor network 330, or any other suitable network. Memory 373 may be a volatile or non-volatile, magnetic, semiconductor, tape, optical, removable, non-removable, or other type of storage device or tangible (e.g., non-transitory) computer-readable medium.

Memory 373 may include graphical user interfaces ("GUI") 374. GUI 374 may allow a user to access, modify, etc. user profile information, user demographic information, user foot traffic data, and/or the like. In certain aspects, as explained further below with reference to FIG. 4, GUI 374 may facilitate an operator to view raw aggregated customer foot traffic information, customer demographic information, lists of in-store retail/electronic displays, maps of customer demographics to in-store displays, maps of inventory to customer demographics, retail inventory lists, display recommendations, or the like. GUI 374 may also allow the operator to issue display instructions to modify one or more items of store equipment, e.g., to modify a retail or electronic display based on the information listed above. Additionally or alternatively, GUI 374 may be stored in database 377 or in an external storage (not shown) in communication with computing system 370 via networks 330, or 350 or any other suitable network.

I/O devices 372 may be one or more device that is configured to allow data to be received and/or transmitted by computing system 370. I/O devices 372 may include one or more digital and/or analog communication devices that allow computing system 370 to communicate with other machines and devices, such as other components of system 300 shown in FIG. 3A. For example, computing system 370 may include interface components, which may provide interfaces to one or more input devices, such as one or more keyboards, mouse devices, and the like, which may enable computing system 370 to receive input from an operator of user device 310.

Computing system 370 may also comprise one or more database(s) 377. Alternatively, computing system 370 may be communicatively connected to one or more database(s) 377. Computing system 370 may be communicatively connected to database(s) 377 through networks 330 or 350. Database 377 may include one or more memory devices that store information and are accessed and/or managed through computing system 370. By way of example, database(s) 377 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. Database 377 may include computing components (e.g., database management system, database server, etc.) configured to receive and process requests for data stored in memory devices of database(s) 377 and to provide data from database 377.

As discussed above, user devices 310, sensors 320, store equipment 360, and/or back-end servers 340 may include at least one computing system 370. Further, although sometimes discussed here in relation to back-end server 340, it should be understood that variations of computing system 370 may be employed by other components of system 300, including user devices 310, sensors 320, and store equipment 360. Computing system 370 may be a single server or may be configured as a distributed computer system including multiple servers or computers that interoperate to perform one or more of the processes and functionalities associated with the disclosed embodiments.

Figure 4:
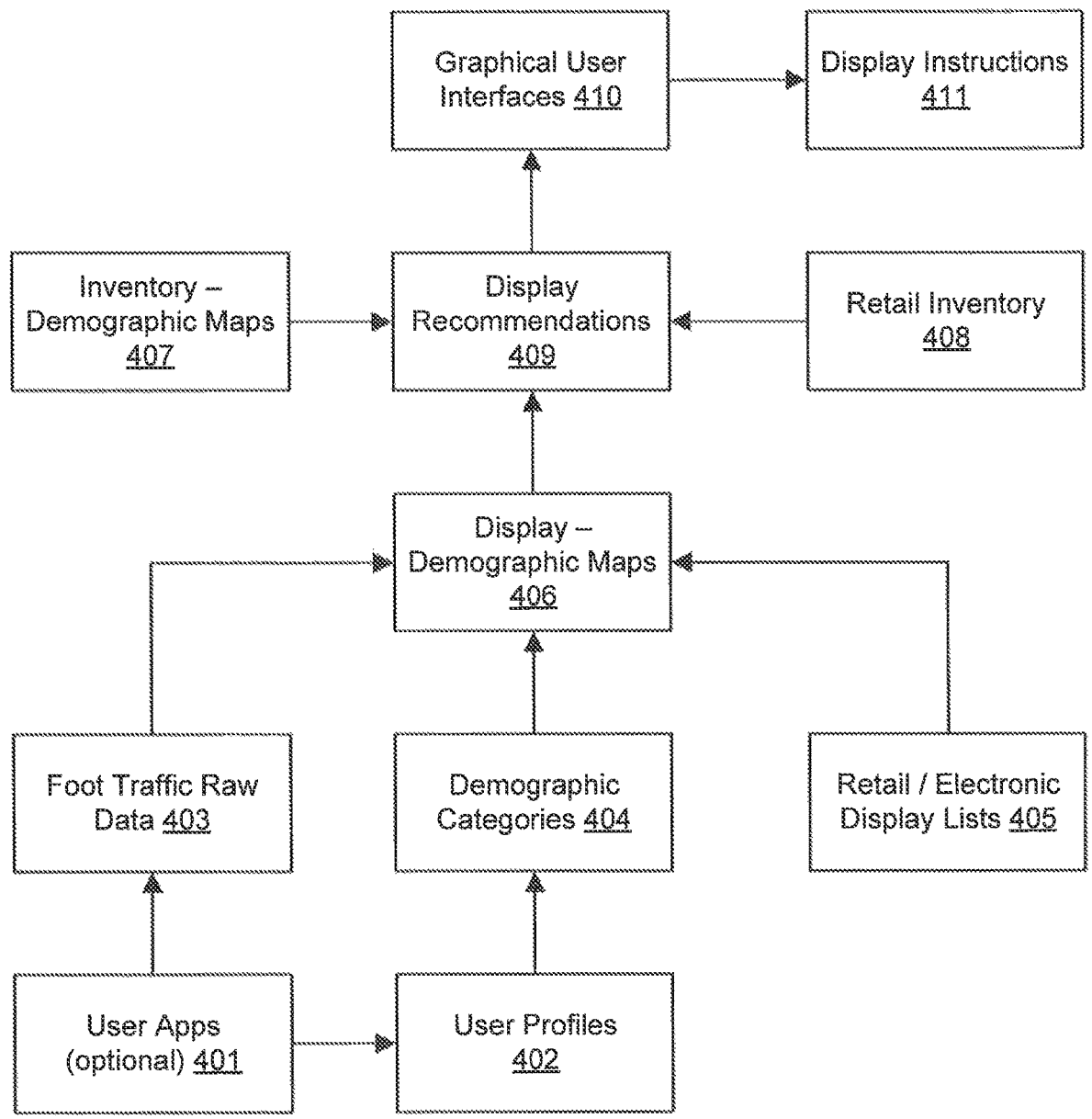
FIG. 4 is a block diagram of exemplary database tables storing information related to product placement optimization using in-store customer traffic patterns, consistent with disclosed embodiments.

FIG. 4 is a block diagram of exemplary database tables storing information related to product placement optimization based on sensed customer traffic in stores, consistent with disclosed embodiments. In some embodiments, a database, e.g., implemented in memory 373 or database 377, may store user applications 401, user profiles 402, foot traffic raw data 403, demographic categories 404, retail/electronic display lists 405, display-demographic maps 406, inventory-demographic maps 407, retail inventory 408, display recommendations 409, graphical user interfaces 410, and display instructions 411. User applications 401 may be designed for execution on user devices 310, to facilitate communication of the user devices 310 with sensors 320, store equipment 360, and/or back-end servers 340. User applications 401 may also be designed to collect user input, including user profile information and/or user demographic information. User profiles 402 may store user profile information and/or user demographic information about the user, such as obtained from use of the user applications 401. Examples of such information include, without limitation, age, gender, marital status, family size, financial account information, credit card or banking information, occupation, salary, and/or the like. Foot traffic raw data 403 may store data obtained from user devices 310 and/or sensors 320, including, without limitation: device ID, sensor ID, store ID, timestamp information, user ID, display ID, time duration, and information on a direction from which the user approached the display. Demographic categories 404 may include a list of all demographics included among the user profiles for customers for whom foot traffic raw data (as stored in 403) was collected by system 300. In addition or in the alternative, such demographic categories may be pre-specified, rather than generated from the user profiles of customers. Retail/electronic display lists 405 may provide information on the store equipment 360 included within the store 100, and may include fields such as, without limitation, display ID, associated sensor ID(s), display name, display type, usage history, and/or the like. In some embodiments, back-end servers 304 may generate and store display-demographic maps 406, using the foot traffic raw data 403, demographic categories 404, and retail/electronic display lists. For example, back-ends servers 304 may use the foot traffic raw data 403 and retail/electronic display lists to correlate users in the stores to the displays within the store that they visit, and then utilize user profiles and/or demographic category data for those users to correlate the displays to the demographic categories. FIG. 2B, 220-230, are examples of such display-demographic maps.

In some embodiments, a retail inventory table 408 may store inventory information for a particular store. Inventory information may include fields such as, without limitation, store ID, stock-keeping unit (SKU) ID, SKU name, quantity, stock date, expiry date, retail price, and/or the like. Inventory-demographic maps 407 may include information from merchandising advertisers on target demographics for their products, product sales testing criteria, and/or the like. In some embodiments, back-end server 340 may utilize such inventory-demographic maps and the retail inventory to generate display recommendations for implementation in the store. Such display recommendations may include identification of products (e.g., by SKU ID), and items for display related to the identified products (e.g., advertisements, wall hangings, billboards, etc.), as well as display conditions (e.g., lighting, sound effects, etc.), and may be stored as display recommendations 409. Graphical user interfaces 410 may be stored in memory 373 and/or database 377, and may provide an interface for viewing the information stored in the database tables. Finally, based on user input and the display recommendations 409, display instructions (e.g., manual instructions, or processor-executable instructions) may be generated for modifying the store equipment 360 to implement optimized product placement in the form of retail/electronic displays. These may be stored as display instructions 411.

Figure 5:
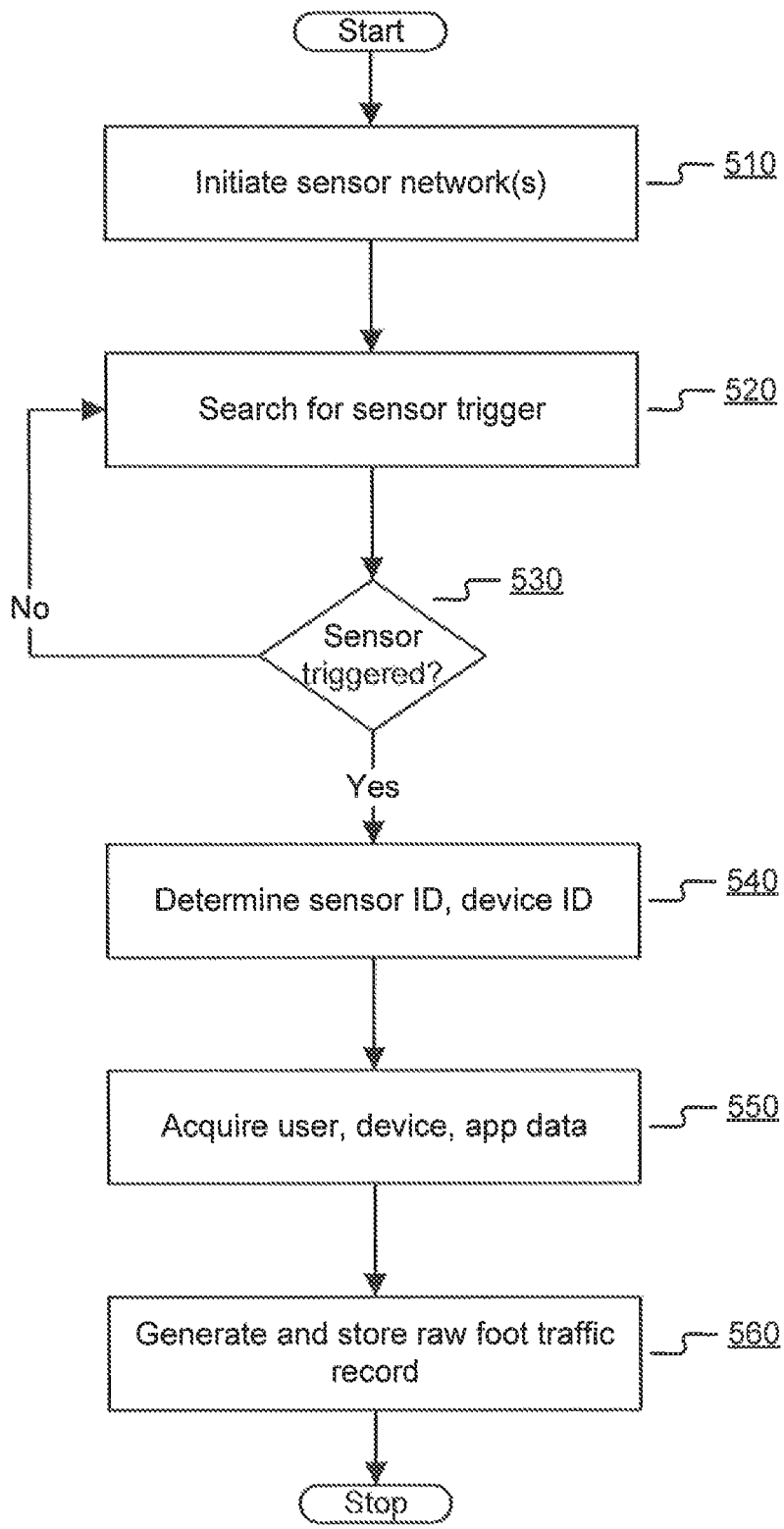
FIG. 5 is a flowchart of an exemplary process for sensing customer traffic in stores, consistent with disclosed embodiments.

FIG. 5 is a flowchart of an exemplary process for sensing customer traffic in stores, consistent with disclosed embodiments. At step 510, system 300 may initiate sensors 320 of sensor network 330 to detect the presence of users/user devices 310 in the store 100. At step 520, the sensors 320 may search for triggers, such as a user device 310 entering into proximity with a sensor. Here, proximity of a user device 310 to a sensor 320 may refer to a state where the user device 310 and sensor 320 can, either uni-directionally or bi-directionally, reliably communicate (e.g., if using packet-switched communication, with a packet loss rate acceptable in the relevant industry) with each other. At step 530, if a sensor is triggered, processing moves on to step 540, where the sensor 320 may provide a sensor ID, and may communicate with user device 310 to obtain a device ID. If the sensor 320 is designed to recognize a user (e.g., via facial/voice/fingerprint recognition, etc.), then sensor 320 may provide a user ID instead of the device ID. At step 550, back-end servers 340 may acquire the sensor data, user data, device data, and app data (if any, of an application executing on the user device 310), via sensor network 330 and/or communication network 350. For example, back-end servers 340 may engage in a separate communication with user device 310 to obtain user ID, user profile data, user demographic categories, and/or the like directly from the user device 310, without the involvement of the sensors 320 or in-store sensor network 330. In this manner, privacy protections for user data may be implemented, such that the retailer does not receive access to personally identifiable information or other sensitive information related to the user. At step 560, back-end servers 340 may generate and store a customer foot traffic raw data record using the information obtained from the sensors 320 and/or user device 310.

Figure 6A:
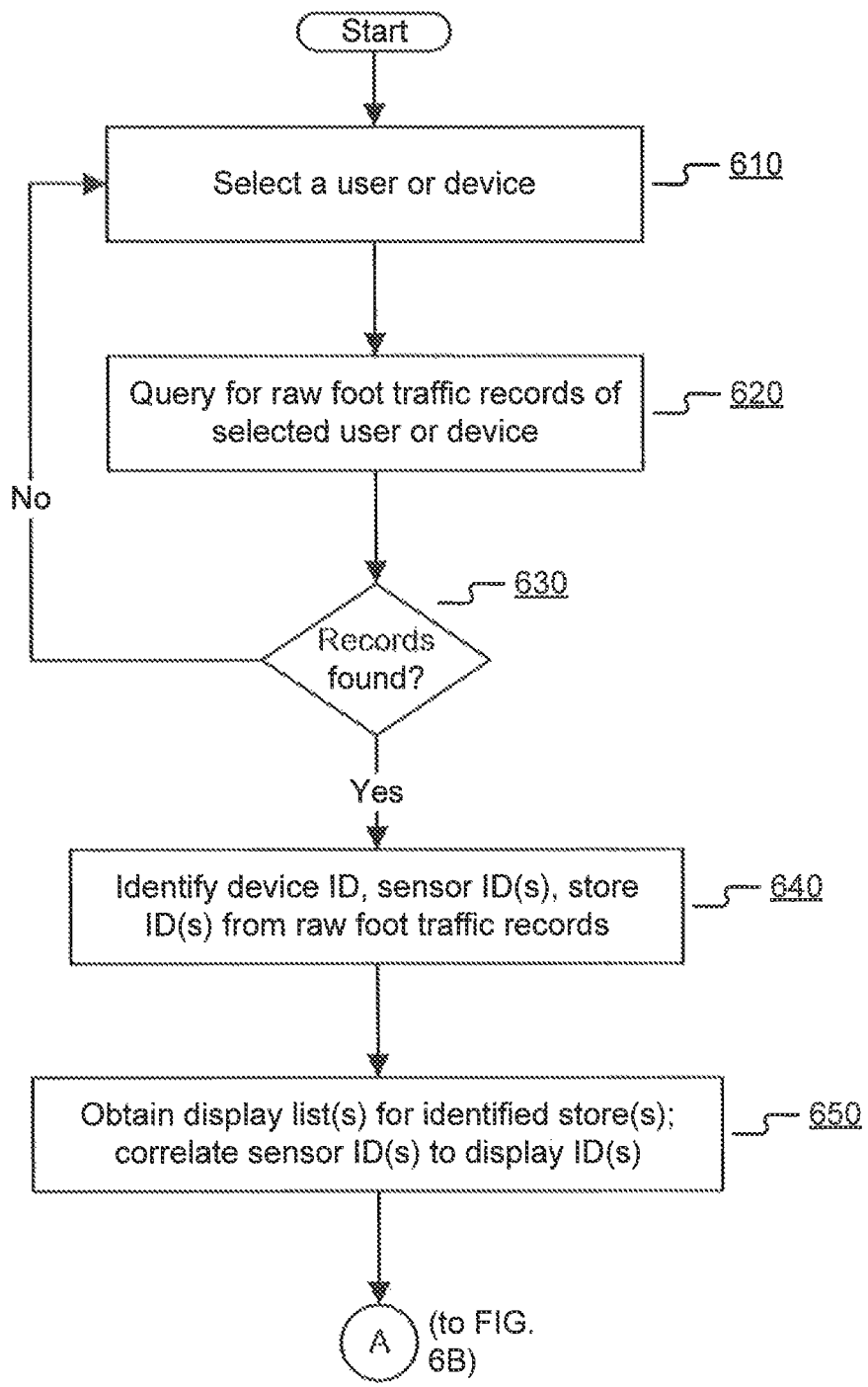
FIGS. 6A-B are flowcharts of an exemplary process for generating aggregate statistics regarding customer traffic in stores, consistent with disclosed embodiments.
Figure 6B:
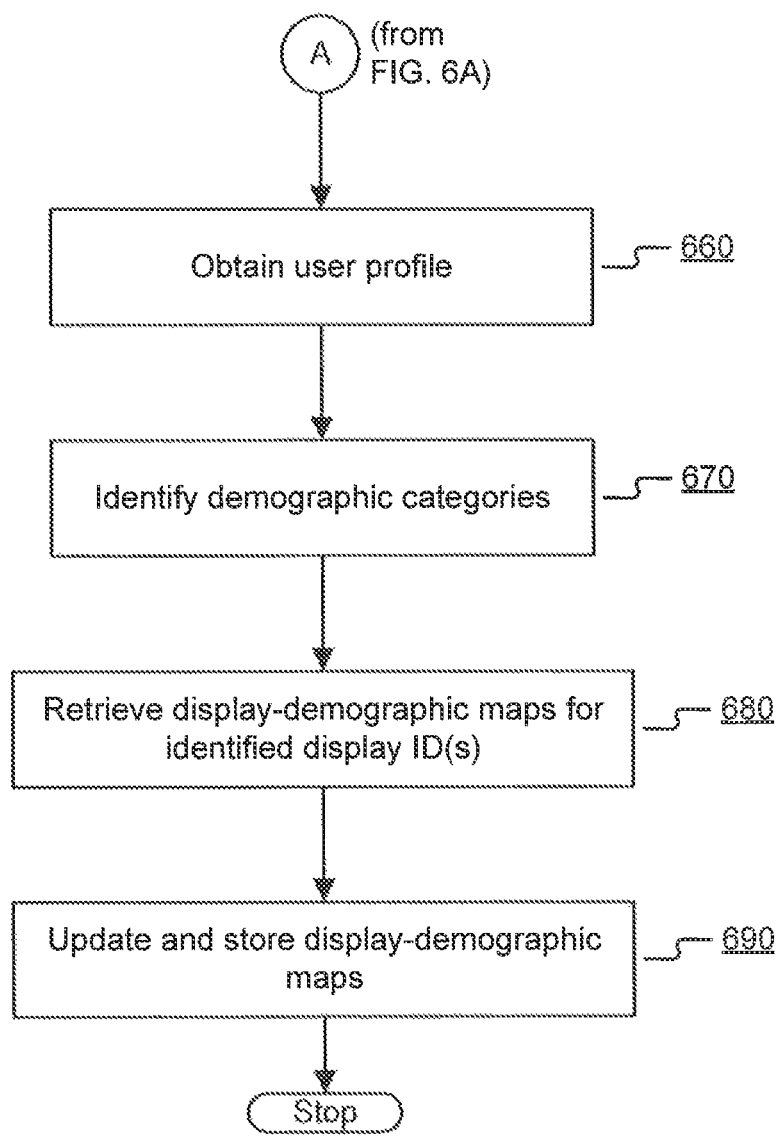

FIGS. 6A-B are flowcharts of an exemplary process for generating aggregate statistics regarding customer traffic in stores, consistent with disclosed embodiments. With reference to FIG. 6A, back-end servers 340 may perform an iterative procedure to build a set of display-demographic maps. For example, back-end servers 340 may generate and store display-demographic maps, using foot traffic raw data, demographic categories, and retail/electronic display lists. For example, back-end servers 340 may use the foot traffic raw data and retail/electronic display lists to correlate users in the stores to the displays within the store that they visit, and then utilize user profiles and/or demographic category data for those users to correlate the displays to the demographic categories. FIG. 2B, 220-230, are examples of such display-demographic maps.

Accordingly, at step 610, back-end servers 340 may select a user or device, and at step 620, query for raw foot traffic records corresponding to the selected user or device. At step 630, if there are no raw foot traffic records corresponding to the selected user or device, the back-end servers 340 may select another user or device, and continue processing. If there are available raw foot traffic records corresponding to the selected user or device, at step 640, the back-end servers 340 may extract from each raw foot traffic record (retrieved in response to the query at step 620), a device ID, user ID, sensor ID, store ID, and any other available information in the record. At step 650, the back-end servers 340 may query database 377 or memory 373 for display lists for the stores identified in the raw foot traffic records corresponding to the selected user or device. Thereby, the back-end servers 340 may retrieve the retail/electronic display lists for the stores where the user or device has generated in-store foot traffic. The back-end servers 340 may then correlate the sensor ID(s) identified in the raw foot traffic records to the display ID(s) for the retail/electronic display lists. Thus, the back-end servers 340 may determine those displays that the user or device visited.

With reference to FIG. 6B, at step 660, the back-end servers 340 may attempt to obtain user demographic information associated with the user or device, in order to generate a mapping between the foot traffic data and the demographics associated with the user or device. The back-end servers 340 may obtain a user profile, e.g., by querying the user device 310 directly, or by querying database 377 or memory 373 for stored user profile information. At step 670, the back-end servers 340 may identify demographic categories from the retrieved user profile information. For example, the back-end servers 340 may determine whether the user satisfies any pre-determined demographic categories as set forth by the retailer associated with the store 100, or as set forth by advertisers of the products on sale at the store where the in-store sensor network has been implemented. For any demographic categories that are identified, the back-end servers 340 may retrieve associated display-demographic maps from storage in order to update them with the information corresponding to the selected user or device. At step 680, the back-end servers 340 may retrieve the display-demographic maps for each display identified at step 650. At step 690, for each display-demographic map retrieved from storage, the back-end servers 340 may generate an updated display-demographic map using the raw foot traffic records of the selected user or device. The back-end servers 340 may store the updated display-demographic maps in the database 377 or memory 373.

Figure 7:
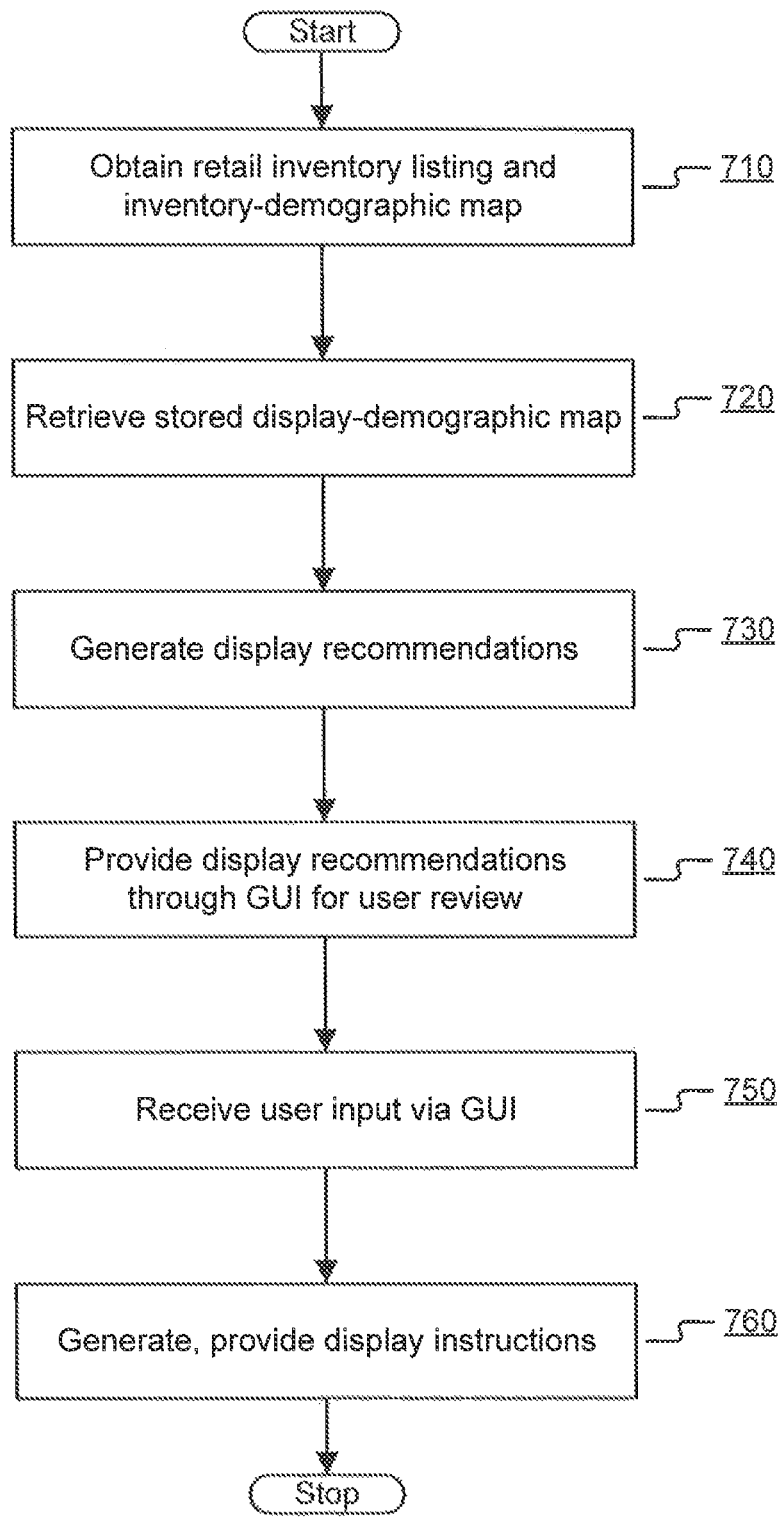
FIG. 7 is a flowchart of an exemplary process for generating product placement optimization recommendations and instructions, consistent with disclosed embodiments.

FIG. 7 is a flowchart of an exemplary process for generating product placement optimization recommendations and instructions, consistent with disclosed embodiments. In some embodiments, back-end server 340 may utilize inventory-demographic maps and the retail inventory to generate display recommendations for implementation in the store. Inventory-demographic maps may include information from merchandising advertisers on target demographics for their products, product sales testing criteria, and/or the like. The display recommendations may include identification of products (e.g., by SKU ID), and items for display related to the identified products (e.g., advertisements, wall hangings, billboards), as well as display conditions (e.g., lighting, sound effects, etc.), and may be stored as display recommendations.

Accordingly, at step 710, the back-end servers 340 may obtain a retail inventory listing for a store participating in the in-store customer foot traffic sensing system, as well as an inventory-demographic map. At step 720, the back-end servers 340 may retrieve from database 377 or memory 373 the stored display-demographic maps for the displays in the store. Based on the display-demographic maps for the displays in the store and the inventory-demographic map, at step 730, the back-end servers 340 may generate display recommendations. At step 740, the back-end servers 340 may provide the display recommendations through a GUI (see, e.g., GUI 374) for review by a store administrator, sales representative, marketing manager, etc. In some embodiments, the GUI may be deployed on a computer remote from the back-end servers 340. At step 750, the back-end servers 340 may receive user input via the GUI. The user input may be used to confirm certain display recommendations, and reject others. Alternatively or in addition, the user input may be used to modify certain display recommendations before issuing them as display instructions. At step 760, the back-end servers 340 may generate and provide display instructions based on the display recommendations and the user input. For example, such display instructions may take the form of a reports instructing manual modification of a product placement presentation (e.g., instructions to change product displayed on a panel, change backlighting color and/or intensity, add sound effects, etc.). As another example, the display instructions may be machine-readable and executable by processor 371 of computing system 370. For example, the instructions may instruct the processor 371 to operate a robotic arm or conveyor belt, or other mechanism to modify a product placement presentation. It may include instructions to modify lighting, signage, background music, billboards on electronic signs, advertisements being displayed on electronic display screens, and/or the like. These instructions may be communicated via communication network 350 or via in-store sensor network 330 to the store equipment 360, which may implement the display instructions in an automated fashion.

In some examples, some or all of the logic for the above-described techniques may be implemented as a computer program or application or as a plug-in module or subcomponent of another application. The described techniques may be varied and are not limited to the examples or descriptions provided.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments. For example, while a retailer has been referred to herein for ease of discussion, it is to be understood that consistent with disclosed embodiments another entity may provide such services in conjunction with or separate from a retailer.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

What is claimed is:

1. An in-store customer traffic analysis system, comprising:
    a sensor network comprising a plurality of sensors positioned within a retail store;
    a plurality of electronic displays positioned within the retail store, a selected one of the electronic displays being associated with a selected one of the sensors;
    one or more memory devices storing instructions; and
    one or more hardware processors configured to execute the instructions to perform operations comprising:
        receiving, over an electronic communications network, a sensor signal indicating that a user device is within a predetermined proximity of the selected sensor;
        extracting a user device identifier from the sensor signal;
        determining, from the sensor signal and based on the association between the selected sensor and the selected electronic display, a direction of travel from which the user device approached the selected electronic display and a duration of time the user device spent in proximity to the selected electronic display;
        generating a foot traffic record associated with the user device identifier and the selected electronic display, based on the sensor signal, the foot traffic record representing an interaction between the user and the electronic display;
        storing the foot traffic record;
        updating, based on the foot traffic record, demographic data of a user demographic group associated with a user of the user device, the user demographic group comprising at least one of an age group, a gender group, a profession group, a nationality group, or a financial spending group;
        determining the updated demographic data in a time slot of a particular day; and
        determining, based on (i) the updated demographic data in the time slot of the particular day and (ii) a frequency with which members of the user demographic group visit the selected electronic display, a score indicating an interest of the user demographic group in the selected electronic display in the time slot of the particular day.

2. The system of claim 1, wherein the sensor is configured to communicate with the user device using a wireless signal.

3. The system of claim 1, wherein the user device comprises a smartphone.

4. The system of claim 1, wherein the operations further comprise:
    obtaining a user profile corresponding to the user device;
    identifying a demographic category related to the user profile;
    generating a demographic map indicating a correlation between the selected electronic display and the demographic category; and
    storing the demographic map.

5. The system of claim 4, wherein the operations further comprise:
    obtaining a retail inventory listing; and
    generating a display recommendation for a product identified in the retail inventory listing based on the demographic map.

6. The system of claim 5, wherein the operations further comprise:
    providing the display recommendation via a graphical user interface.

7. The system of claim 6, wherein the operations further comprise:
    obtaining a user input via the graphical user interface in response to providing the display recommendation;
    generating a display instruction based on the user input; and
    providing the display instruction via the graphical user interface.

8. The system of claim 5, wherein the operations further comprise:
    generating a display instruction based on the display recommendation, the display instruction comprising a processor-executable instruction to modify the selected electronic display.

9. The system of claim 1, wherein the operations further comprise:
    calculating a score indicating a relative interest level for the electronic display by the identified demographic category; and
    displaying the score on the demographic map.

10. A method for in-store customer traffic analysis, comprising:
    receiving, over an electronic communications network, a sensor signal indicating that a user device is within a predetermined proximity to a sensor in a retail store, the sensor being associated with an electronic display in the retail store;
    extracting, by one or more processors, a user device identifier from the sensor signal;
    determining, by the one or more processors from the sensor signal and based on the association between the sensor and the electronic display, a direction of travel from which the user device approached the electronic display and a duration of time the user device spent in proximity to the electronic display;
    generating, by the one or more processors, a foot traffic record associated with the user device identifier and the electronic display, based on the sensor signal, the foot traffic record representing an interaction between the user and the electronic display;
    storing the foot traffic record;
    updating, based on the foot traffic record, demographic data of a user demographic group associated with a user of the user device, the user demographic group comprising at least one of an age group, a gender group, a profession group, a nationality group, or a financial spending group;

determining the updated demographic data in a time slot of a particular day; and determining, based on (i) the updated demographic data in the time slot of the particular day and (ii) a frequency with which members of the user demographic group visit the selected electronic display, a score indicating an interest of the user demographic group in the electronic display in the time slot of the particular day.

11. The method of claim 10, further comprising:

obtaining, by the one or more processors, a user profile corresponding to the user device;

identifying a demographic category related to the user profile;

generating a demographic map indicating a correlation between the electronic display and the demographic category; and storing the demographic map.

12. The method of claim 11, further comprising:

obtaining, by the one or more processors, a retail inventory listing; and generating a display recommendation for a product identified in the retail inventory listing based on the demographic map.

13. The method of claim 12, further comprising:

providing the display recommendation by the one or more processors via a graphical user interface.

14. The method of claim 13, further comprising:

obtaining a user input via the graphical user interface in response to providing the display recommendation;

generating, by the one or more processors, a display instruction based on the user input; and providing the display instruction via the graphical user interface.

15. The method of claim 12, further comprising:

generating, by the one or more processors, a display instruction based on the display recommendation, the display instruction comprising a processor-executable instruction to modify the electronic display.

16. A non-transitory computer-readable medium storing instructions that, when executed by one or more hardware processors, configure the one or more hardware processors to perform operations comprising:

receiving, over an electronic communications network, a sensor signal indicating that a user device is within a predetermined proximity to a sensor in a retail store, the sensor being associated with an electronic display in the retail store;

extracting a user device identifier from the sensor signal;

determining from the sensor signal, and based on the association between the sensor and the electronic display, a direction of travel from which the user device approached the electronic display and a duration of time the user device spent in proximity to the electronic display;

generating a foot traffic record associated with the user device identifier and the electronic display, based on the received sensor signal, the foot traffic record representing an interaction between the user and the electronic display;

storing the foot traffic record;

updating, based on the foot traffic record, demographic data of a user demographic group associated with a user of the user device, the user demographic group comprising at least one of an age group, a gender group, a profession group, a nationality group, or a financial spending group;

determining the updated demographic data in a time slot of a particular day; and determining, based on (i) the updated demographic data in the time slot of the particular day and (ii) a frequency with which members of the user demographic group visit the selected electronic display, a score indicating an interest of the user demographic group in the electronic display in the time slot of the particular day.

17. The non-transitory computer-readable medium of claim 16, the operations further comprising:

obtaining a user profile corresponding to the user device;

identifying a demographic category related to the user profile;

generating a demographic map indicating a correlation between the electronic display and the demographic category; and storing the demographic map.

18. The non-transitory computer-readable medium of claim 17, the operations further comprising:

obtaining a retail inventory listing; and generating a display recommendation for a product identified in the retail inventory listing, based on the demographic map.

19. The non-transitory computer-readable medium of claim 18, the operations further comprising:

providing, by the one or more processors, the display recommendation via a graphical user interface;

generating a display instruction based on user input received in response to providing the display recommendation; and providing the display instruction via the graphical user interface.

20. The non-transitory computer-readable medium of claim 18, the operations further comprising:

generating a display instruction based on the display recommendation, the display instruction comprising a processor-executable instruction to modify the electronic display.

* * * * *